United States Patent
Tateda et al.

(10) Patent No.: US 9,899,954 B2
(45) Date of Patent: Feb. 20, 2018

(54) MOTOR DRIVE APPARATUS HAVING FUNCTION OF DETECTING FAILURE OF ELECTRIC SHUNT

(71) Applicant: FANUC CORPORATION, Yamanashi (JP)

(72) Inventors: Masaya Tateda, Yamanashi (JP); Youichirou Ooi, Yamanashi (JP); Akira Hirai, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 32 days.

(21) Appl. No.: 15/241,507

(22) Filed: Aug. 19, 2016

(65) Prior Publication Data

US 2017/0063279 A1 Mar. 2, 2017

(30) Foreign Application Priority Data

Aug. 27, 2015 (JP) ................... 2015-167944

(51) Int. Cl.
*H02P 29/00* (2016.01)
*H02P 29/024* (2016.01)
*H02P 3/22* (2006.01)

(52) U.S. Cl.
CPC ............. *H02P 29/024* (2013.01); *H02P 3/22* (2013.01); *H02P 29/0241* (2016.02)

(58) Field of Classification Search
CPC .................................................. H02P 29/024
USPC .................................. 318/381, 379, 375, 362
See application file for complete search history.

(56) References Cited

U.S. PATENT DOCUMENTS 5,780,989 A * 7/1998 Matsumoto ............. H02P 23/16
318/568.22
2013/0009587 A1 1/2013 Yabuguchi et al.

FOREIGN PATENT DOCUMENTS

| JP | 8149882 A | 6/1996 |
| JP | 2000253687 A | 9/2000 |
| JP | 2006158009 A | 6/2006 |
| JP | 2009165296 A | 7/2009 |
| JP | 2010139244 A | 6/2010 |
| JP | 201317363 A | 1/2013 |
| JP | 2013070566 A | 4/2013 |

OTHER PUBLICATIONS

English Abstract and Machine Translation for Japanese Publication No. 2013-070566 A, published Apr. 18, 2013, 34 pgs.

(Continued)

*Primary Examiner* — David S Luo
(74) *Attorney, Agent, or Firm* — Fredrikson & Byron, P.A.

(57) ABSTRACT

A motor drive apparatus according to the present invention comprises: an electric shunt which shunts a current flowing through a power line connected to a motor; a first current detection unit and a second detection unit, each disposed on either side of a node shunted by the electric shunt, for detecting the current flowing through the power line; a shunt commanding unit which gives a shunt command to the electric shunt to effect shunting of the current; and a determining unit which determines the presence or absence of a fault in the electric shunt, based on the shunt command and on current values detected by the first current detection unit and the second detection unit.

5 Claims, 4 Drawing Sheets

(56) References Cited

OTHER PUBLICATIONS

English Abstract for Japanese Publication No. 2013-017363 A, published Jan. 24, 2013, 10 pg.
English Abstract for Japanese Publication No. 2010-139244 A, published Jun. 24, 2010, 1 pg.
English Abstract for Japanese Publication No. 2009-165296 A, published Jul. 23, 2009, 1 pg.
English Abstract for Japanese Publication No. 2006-158009 A, published Jun. 15, 2006, 1 pg.
English Abstract for Japanese Publication No. 2000-253687 A, published Sep. 14, 2000, 1 pg.
English Abstract for Japanese Publication No. 08149882 A, published Jun. 7, 1996, 1 pg.
Untranslated Decision to Grant a Patent mailed by Japan Patent Office (JPO)) for Application No. JP 2015-167944 Jul. 25, 2017, 3 pages.
English machine translation of Decision to Grant a Patent mailed by Japan Patent Office (JPO) for Application No. JP 2015-167944, Jul. 25, 2017, 3 pages.

* cited by examiner

MOTOR DRIVE APPARATUS HAVING FUNCTION OF DETECTING FAILURE OF ELECTRIC SHUNT

BACKGROUND OF THE INVENTION

1. Field of the Invention

The present invention relates to a motor drive apparatus having a current detection unit, and more particularly to a motor drive apparatus having the function of detecting failure of an electric shunt by the inclusion of a plurality of current detection units.

2. Description of the Related Art

A method is known which quickly stops a motor by short-circuiting between the phases of the motor or connecting between them via a resistor and thereby shunting the current away from a motor drive apparatus (for example, refer to Japanese Unexamined Patent Publication No. 2013-70566).

On the other hand, it is known to provide a method which detects one current value using a plurality of current detection circuits, and which, in the event of failure of any one current detection circuit, detects the failure and performs current detection using the remaining current detection circuits. It is also known to provide a method that compensates for variations in the characteristics of a plurality of current detection circuits by taking an average of the detection results supplied from the current detection circuits.

SUMMARY OF THE INVENTION

However, there has been the problem that, if a plurality of current detection circuits are provided in a motor drive apparatus that has the function of shunting the motor current, it is not possible to detect failure of the portion that shunts the motor current.

A motor drive apparatus according to one embodiment of the present invention comprises: an electric shunt for shunting a current flowing through a power line connected to a motor; a first current detection unit and a second detection unit, each disposed on either side of a node shunted by the electric shunt, for detecting the current flowing through the power line; a shunt commanding unit for giving a shunt command to the electric shunt to effect shunting of the current; and a determining unit for determining the presence or absence of a fault in the electric shunt, based on the shunt command and on current values detected by the first current detection unit and the second detection unit.

BRIEF DESCRIPTION OF THE DRAWINGS

The above and other objects, features, and advantages of the present invention will become more apparent from the description of the preferred embodiments as set forth below with reference to the accompanying drawings, wherein.

DETAILED DESCRIPTION

Motor drive apparatus according to the present invention will be described below with reference to the drawings.

First Embodiment

Figure 1:
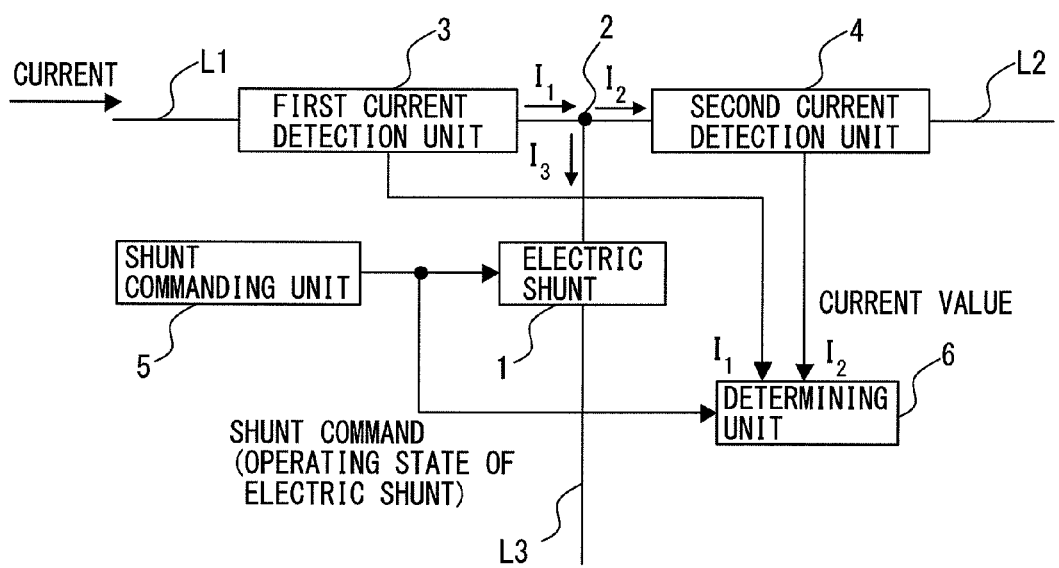
FIG. 1 is a diagram showing the configuration of a motor drive apparatus according to a first embodiment of the present invention.

A motor drive apparatus according to a first embodiment of the present invention will be described. FIG. 1 shows the configuration of the motor drive apparatus according to the first embodiment of the present invention. The motor drive apparatus according to the first embodiment of the present invention includes an electric shunt 1, a first current detection unit 3, a second current detection unit 4, a shunt commanding unit 5, and a determining unit 6.

The electric shunt 1 shunts the current flowing through power lines L1 and L2 connected between a power supply and a motor (not shown). As shown in FIG. 1, the power line L1 connected to the power supply (not shown) and the power line L2 connected to the motor are connected together at a node 2. The electric shunt 1 is also connected to the node 2 via a line L3. Denoting the current flowing through the power line L1 by $I_1$, the current flowing through the power line L2 by $I_2$, and the current flowing through the line L3 by $I_3$, the relation $I_1=I_2+I_3$ holds. When the electric shunt 1 is operating normally, a current of a prescribed magnitude flows in the electric shunt 1, that is, $I_3 \neq 0$. Accordingly, when the electric shunt 1 is operating normally, the current $I_1$ flowing through the power line L1 does not equal the current $I_2$ flowing through the power line L2 ($I_1 \neq I_2$).

In the power lines L1 and L2, the first current detection unit 3 and the second current detection unit 4 are disposed, one on each side of the node 2 shunted by the electric shunt 1, and detect the currents $I_1$ and $I_2$. For example, the first current detection unit 3 may be placed between the power supply and the node 2, and the second current detection unit 4 may be placed between the node 2 and the motor. In that case, the current $I_1$ supplied from the power supply is detected by the first current detection unit 3, while the current $I_2$ supplied to the motor is detected by the second current detection unit 4.

The shunt commanding unit 5 gives a shunt command to the electric shunt 1 to effect shunting of the current. The shunt command output from the shunt commanding unit 5 is also supplied to the determining unit 6. The electric shunt 1 effects the shunting by acquiring the shunt command from the shunt commanding unit 5. This means that when the electric shunt 1 is not effecting the shunting by acquiring the shunt command, no current flows to the electric shunt ($I_3=0$).

The determining unit 6 determines the presence or absence of a fault in the electric shunt 1, based on the shunt command and on the current values detected by the first current detection unit 3 and the second current detection unit 4. By acquiring the shunt command, the determining unit 6 can identify the state of the electric shunt 1, that is, whether the electric shunt 1 is operating or not. When the electric shunt 1 is operating to effect the shunting, if the current value $I_1$ detected by the first current detection unit 3 is substantially equal to the current value $I_2$ detected by the second current detection unit 4, then the determining unit 6 can determine that a fault has occurred in the electric shunt 1. That is, when the electric shunt 1 is not operating, $I_1$ is equal to $I_2$, but when the electric shunt 1 is operating normally, $I_1$ is not substantially equal to $I_2$. Accordingly, if $I_1$ is substantially equal to $I_2$ even though the electric shunt 1 is operating, it can be determined that a fault has occurred in the electric shunt 1.

When the shunt commanding unit 5 is not outputting the shunt command, shunting of the current is not effected if there is no fault in the electric shunt 1. In this case, the first current detection unit 3 and the second current detection unit 4 should detect the currents of the same value. When the shunt commanding unit 5 is not outputting the shunt command, if the current value detected by the first current detection unit 3 is significantly different from the current value detected by the second current detection unit 4, then the determining unit 6 can determine that a fault has occurred in at least one of the first and second current detection units 3 and 4 or that the electric shunt 1 is malfunctioning.

Figure 2:
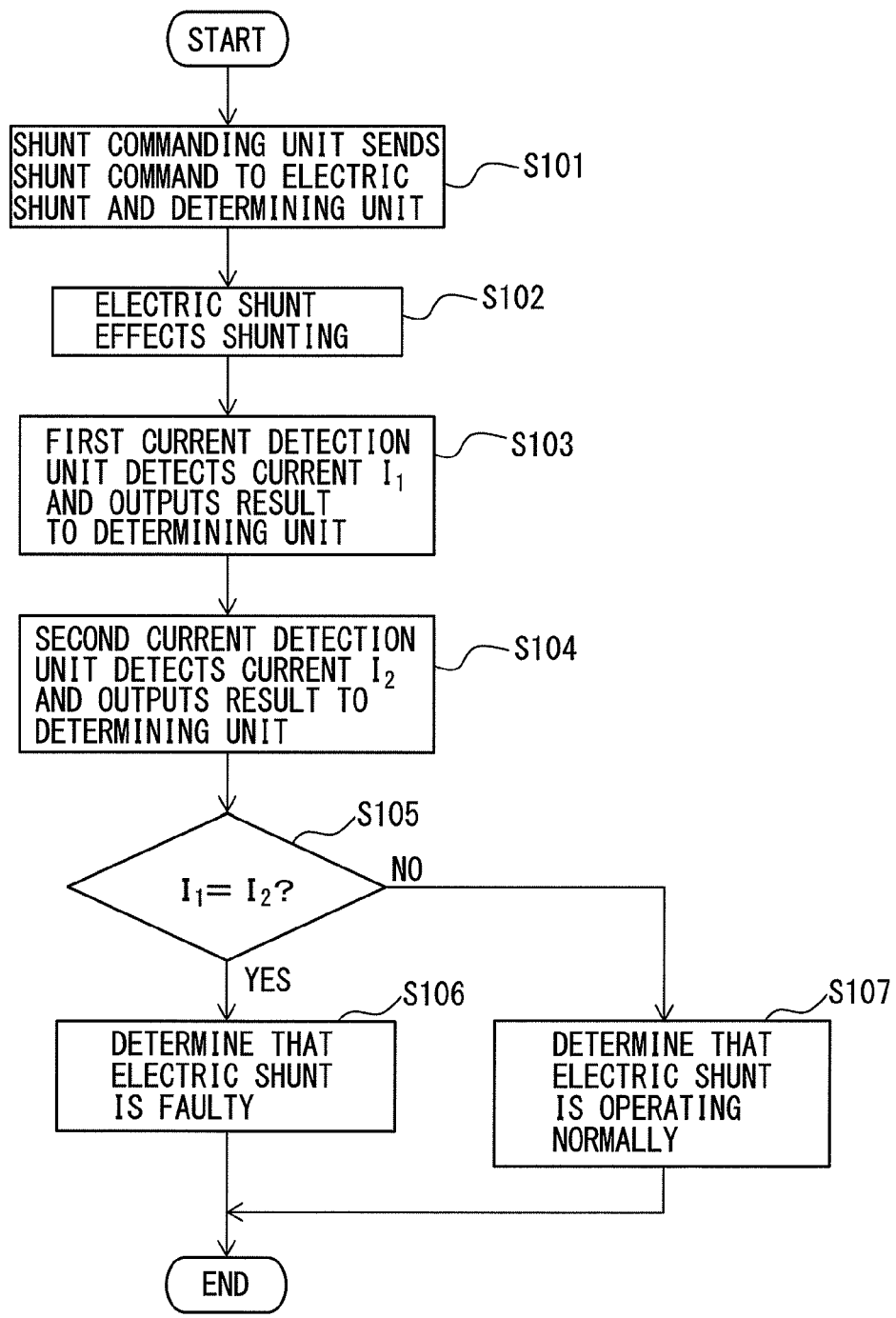
FIG. 2 is a flowchart for explaining the sequence of operations performed by the motor drive apparatus according to the first embodiment of the present invention.

Next, the sequence of operations performed by the motor drive apparatus according to the first embodiment of the present invention will be described with reference to the flowchart of FIG. 2. First, in step S101, the shunt commanding unit 5 sends a shunt command to the electric shunt 1 and the determining unit 6. By acquiring the shunt command, the determining unit 6 can identify that the electric shunt 1 is in an operating condition.

Next, in step S102, the electric shunt 1 effects shunting. When the electric shunt 1 effects the shunting, the current $I_3$ having a prescribed magnitude ($I_3 \neq 0$) flows to the electric shunt 1 if the electric shunt 1 is operating normally.

In step S103, the first current detection unit 3 detects the current $I_1$ and outputs the result to the determining unit 6. Similarly, in step S104, the second current detection unit 4 detects the current $I_2$ and outputs the result to the determining unit 6.

In step S105, after confirming that the electric shunt 1 is operating to effect the shunting, the determining unit 6 determines whether or not the current value $I_1$ detected by the first current detection unit 3 is substantially equal to the current value $I_2$ detected by the second current detection unit 4. That is, the determining unit 6 determines whether the relation $I_1 = I_2$ holds or not.

If the current value $I_1$ detected by the first current detection unit 3 is substantially equal to the current value $I_2$ detected by the second current detection unit 4, the determining unit 6 proceeds to step S106 to determine that the electric shunt 1 is faulty.

On the other hand, if the current value $I_1$ detected by the first current detection unit 3 is not substantially equal to the current value $I_2$ detected by the second current detection unit 4, the determining unit 6 proceeds to step S107 to determine that the electric shunt 1 is operating normally.

As has been described above, the motor drive apparatus according to the first embodiment of the present invention can detect the occurrence of a fault in the electric shunt while retaining the function of detecting the occurrence of a fault in any one of the current detection units and the function of compensating for variations in the characteristics of the respective current detection circuits by taking an average of the detected current values by using a plurality of current detection units, as in the prior art.

Second Embodiment

Next, a motor drive apparatus according to a second embodiment of the present invention will be described. The motor drive apparatus according to the second embodiment of the present invention differs from the motor drive apparatus according to the first embodiment, mainly in that switches 71 and 72 for short-circuiting the phases of the motor power lines are used as the electric shunt 1. Otherwise, the configuration of the motor drive apparatus according to the second embodiment is identical to that of the motor drive apparatus according to the first embodiment, and therefore, a detail description of the configuration will not be repeated here.

Figure 3:
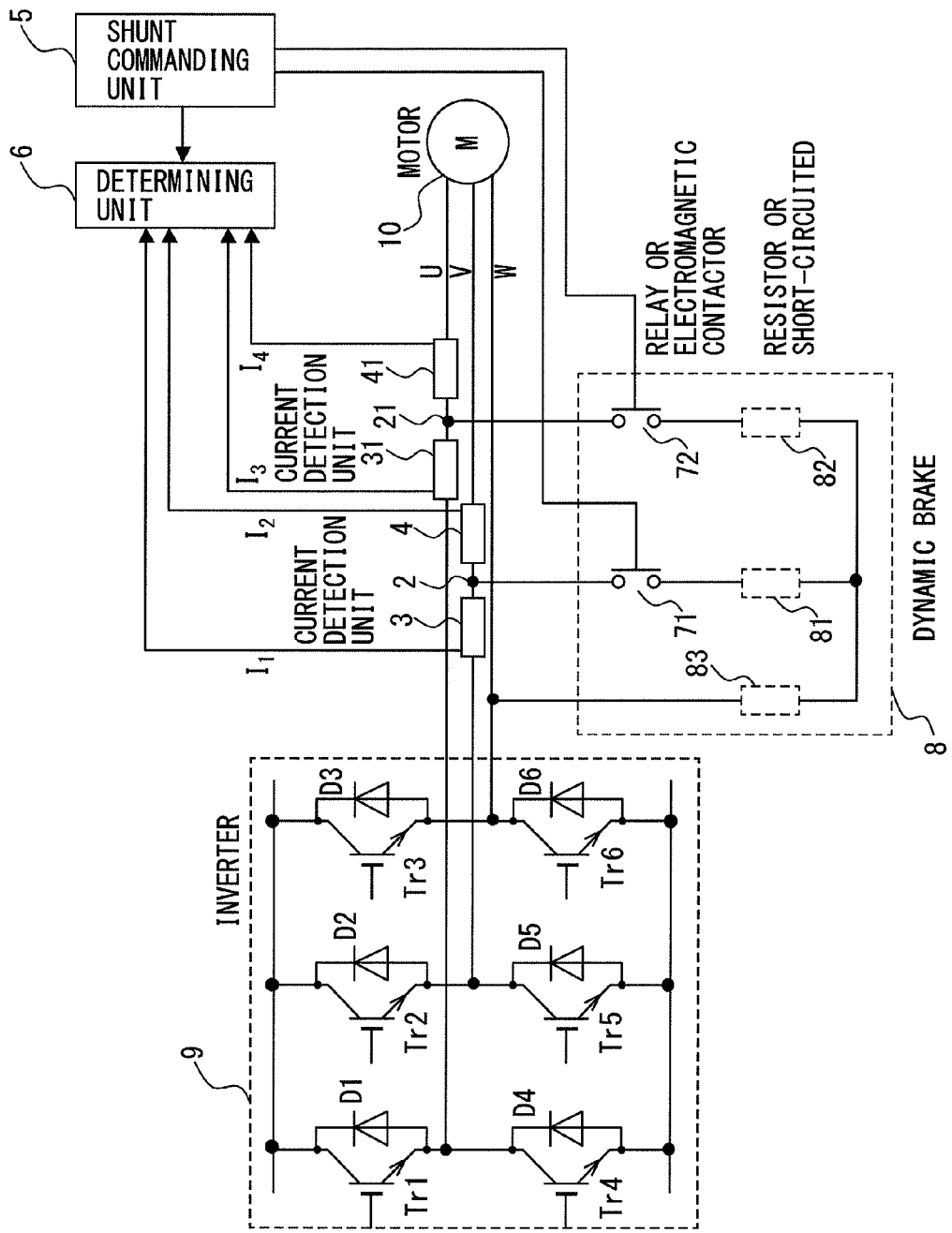
FIG. 3 is a diagram showing the configuration of a motor drive apparatus according to a second embodiment of the present invention.

FIG. 3 shows the configuration of the motor drive apparatus according to the second embodiment of the present invention. An inverter 9, which includes transistors Tr1 to Tr6 and diodes D1 to 06, constitutes part of the motor drive apparatus, and two current detection units are provided for each phase. More specifically, in the V-phase power line, the first current detection unit 3 is provided between the inverter 9 and the node 2, and the second current detection unit 4 is provided between the motor 10 and the node 2. Similarly, in the U-phase power line, the third current detection unit 31 is provided between the inverter 9 and the node 21, and the fourth current detection unit 41 is provided between the motor 10 and the node 21.

A dynamic brake 8 may be used as the electric shunt. The dynamic brake 8 is configured to be able to connect between the U-phase and V-phase motor power lines via the switches 71 and 72 and resistors 81, 82, and 83. Relays or electromagnetic contactors can be used as the switches 71 and 72. The dynamic brake 8 acts to quickly stop the motor 10 by causing the energy of the motor 10 to be consumed through the resistors 81 to 83.

In the example shown in FIG. 3, the dynamic brake 8 uses the resistors 81 to 83. However, relays or electromagnetic contactors may be used to short-circuit the phases. In the embodiment illustrated here, the U-phase and the V-phase are connected together by using the switches 71 and 72, but the configuration is not limited to the illustrated example. For example, other phases, for example, the U-phase and the W-phase, may be connected together by using the switches, or other two phases may be connected together.

The shunt commanding unit 5 outputs a shunt command to the dynamic brake 8 acting as the electric shunt. By operating the switches 71 and 72 in response to the shunt command, the dynamic brake 8 can shunt the currents flowing through the U-phase and V-phase power lines.

The determining unit 6 determines the presence or absence of a fault in the dynamic brake 8, based on the shunt command and on the current values detected by the first current detection unit 3 and the second current detection unit 4 or the current values detected by the third current detection unit 31 and the fourth current detection unit 41.

When stopping the motor 10 in an emergency, a shunt signal is output from the shunt commanding unit 5, and the relays or electromagnetic contactors acting as the switches 71 and 72 are activated to shunt the motor current. If, at this time, the current detection units placed before and after the dynamic brake 8 are outputting substantially the same value, then it is determined that a fault has occurred in the dynamic brake 8 because the shunting is not done correctly.

In normal operation, shunting is not effected, and if there is no fault, the first and second current detection units 3 and 4 placed before and after the dynamic brake 8 should be outputting substantially the same value, and the third and fourth current detection units 31 and 41 should also be outputting substantially the same value. In view of this, if the output values are different, it can be determined that a fault has occurred in at least one of the first to fourth current detection units 3, 4, 31, and 41 or that the dynamic brake 8 is malfunctioning.

The current value detected by the first current detection unit 3 or the second current detection unit 4, whichever current detection unit in which the current no longer flows as a result of the phase short-circuiting accomplished by the electric shunt, may be recorded as an offset for that current detection unit, and a correction may be made to the offset. The embodiment of the motor drive apparatus of FIG. 3 is taken as an example. In order to stop the motor 10, all the transistors Tr1 to Tr6 in the inverter 9 are turned off, and the shunt signal from the shunt commanding unit 5 is applied to the switches 71 and 72 to effect the shunting. Since, at this time, no current flows to either of the first and third current detection units 3 and 31, the output value $I_1$ of the first current detection unit 3 and the output value $I_3$ of the third current detection unit 31 provide the offset values for the respective current detection units. These offset values are recorded and used to correct the offset.

Figure 4:
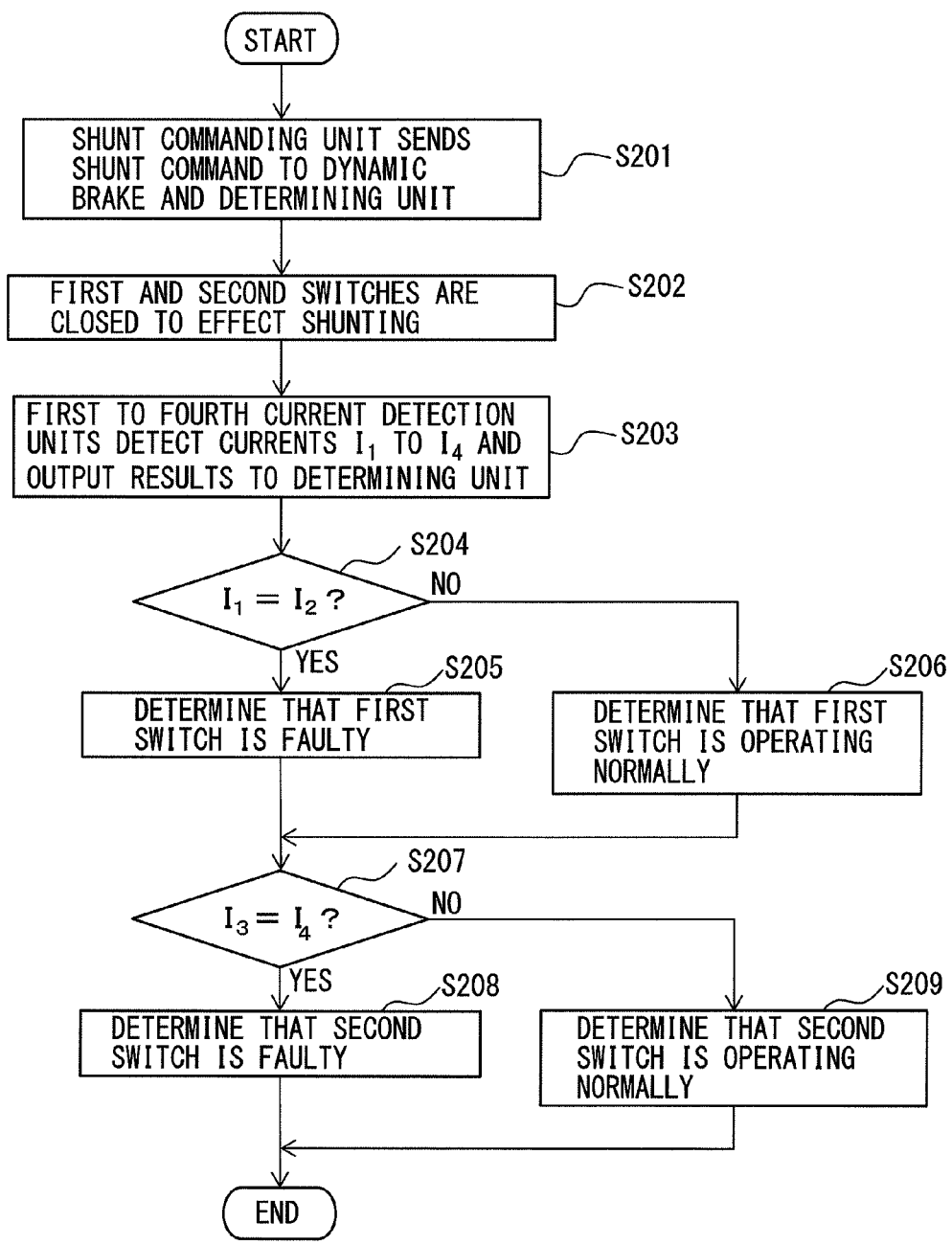
FIG. 4 is a flowchart for explaining the sequence of operations performed by the motor drive apparatus according to the second embodiment of the present invention.

Next, the sequence of operations performed by the motor drive apparatus according to the second embodiment of the present invention will be described with reference to the flowchart of FIG. 4. First, in step S201, the shunt commanding unit 5 sends a shunt command to the dynamic brake 8 and the determining unit 6. By acquiring the shunt command, the determining unit 6 can identify that the dynamic brake 8 is in the process of effecting shunting.

Next, in step S202, the first switch 71 and the second switch 72 are closed to effect the shunting. More specifically, when the first switch 71 is closed, the V-phase current is shunted to the dynamic brake 8, and when the second switch 72 is closed, the U-phase current is shunted to the dynamic brake 8.

In step S203, the first to fourth current detection units 3, 4, 31, and 41 detect the currents $I_1$ to $I_4$ and output the results to the determining unit 6.

In step S204, after confirming that the dynamic brake 8 is operating to effect the shunting, the determining unit 6 determines whether or not the current value $I_1$ detected by the first current detection unit 3 is substantially equal to the current value $I_2$ detected by the second current detection unit 4. That is, the determining unit 6 determines whether the relation $I_1=I_2$ holds or not.

If the current value $I_1$ detected by the first current detection unit 3 is substantially equal to the current value $I_2$ detected by the second current detection unit 4, the determining unit 6 proceeds to step S205 to determine that the first switch 71 in the dynamic brake 8 is faulty.

On the other hand, if the current value $I_1$ detected by the first current detection unit 3 is not substantially equal to the current value $I_2$ detected by the second current detection unit 4, the determining unit 6 proceeds to step S206 to determine that the first switch 71 in the dynamic brake 8 is operating normally.

In step S207, after confirming that the dynamic brake 8 is operating to effect the shunting, the determining unit 6 determines whether or not the current value $I_3$ detected by the third current detection unit 31 is substantially equal to the current value $I_4$ detected by the fourth current detection unit 41. That is, the determining unit 6 determines whether the relation $I_3=I_4$ holds or not.

If the current value $I_3$ detected by the third current detection unit 31 is substantially equal to the current value $I_4$ detected by the fourth current detection unit 41, the determining unit 6 proceeds to step S208 to determine that the second switch 72 in the dynamic brake 8 is faulty.

On the other hand, if the current value $I_3$ detected by the third current detection unit 31 is not substantially equal to the current value $I_4$ detected by the fourth current detection unit 41, the determining unit 6 proceeds to step S209 to determine that the second switch 72 in the dynamic brake 8 is operating normally.

As has been described above, according to the present invention, the occurrence of a fault in the shunt circuit can be detected while retaining the advantages achieved by providing multiple current detection units.

According to the motor drive apparatus in any one of the embodiments of the present invention, while using the plurality of current detection circuits and while retaining the effect of detecting the occurrence of a fault in any one of the current detection circuits and the effect of compensating for variations in the characteristics of the measuring circuits by taking an average of the measured values, the presence or absence of a fault in the component for shunting the measuring current can be determined without using any additional component.

The invention claimed is:

1. A motor drive apparatus comprising:
   an electric shunt configured to shunt a current flowing through a power line connected to a motor;
   a first current detection unit and a second detection unit, each disposed on either side of a node shunted by the electric shunt, configured to detect the current flowing through the power line;
   a shunt commanding unit configured to give a shunt command to the electric shunt to effect shunting of the current; and
   a determining unit configured to determine the presence or absence of a fault in the electric shunt, based on the shunt command and on current values detected by the first current detection unit and the second detection unit.

2. The motor drive apparatus according to claim 1, wherein when the electric shunt is operating to effect the shunting, if the current value detected by the first current detection unit is substantially equal to the current value detected by the second current detection unit, the determining unit determines that a fault has occurred in the electric shunt.

3. The motor drive apparatus according to claim 1, wherein a switch for short-circuiting between phases of the motor power line is used as the electric shunt.

4. The motor drive apparatus according to claim 3, wherein the current value detected by the first current detection unit or the second current detection unit, whichever current detection unit in which the current no longer flows as a result of the phase short-circuiting accomplished by the electric shunt, is recorded as an offset for the current detection unit, and a correction is made to the offset.

5. The motor drive apparatus according to claim 1, wherein a dynamic brake is used as the electric shunt, and wherein the dynamic brake is configured to connect between phases of the motor power line via a switch and a resistor.

\* \* \* \* \*